(12) United States Patent
Levi et al.

(10) Patent No.: US 9,252,977 B2
(45) Date of Patent: *Feb. 2, 2016

(54) METHOD AND SYSTEM FOR AN UNCOMPROMISING CONNECTION FROM A COMPUTING DEVICE HAVING INFORMATION STORAGE LIKE EMAIL SERVER TO A WIRELESS MOBILE DEVICE

(75) Inventors: Moshe Levi, Petach Tikva (IL); Moshe Dgani, Holon (IL)

(73) Assignee: B.S.D. CROWN LTD, Tel-Aviv (IL)

( * ) Notice: Subject to any disclaimer, the term of this patent is extended or adjusted under 35 U.S.C. 154(b) by 1846 days.

This patent is subject to a terminal disclaimer.

(21) Appl. No.: 11/266,541

(22) Filed: Nov. 3, 2005

(65) Prior Publication Data

US 2007/0100978 A1 May 3, 2007

(51) Int. Cl.
*G06F 15/16* (2006.01)
*H04L 12/58* (2006.01)

(52) U.S. Cl.
CPC ........ *H04L 12/5855* (2013.01); *H04L 12/5895* (2013.01); *H04L 51/00* (2013.01); *H04L 51/14* (2013.01); *H04L 51/22* (2013.01); *H04L 51/38* (2013.01)

(58) Field of Classification Search
CPC ....... H04L 51/00; H04L 51/043; H04L 51/30; H04L 51/38; H04L 67/26
USPC ........................................................ 709/206
See application file for complete search history.

(56) References Cited

U.S. PATENT DOCUMENTS

| | | | | |
|---|---|---|---|---|
| 5,625,670 | A * | 4/1997 | Campana, Jr. | H04L 12/589 370/428 |
| 7,269,629 | B2 * | 9/2007 | Zmudzinski | H04L 12/581 709/206 |
| 7,464,178 | B2 * | 12/2008 | Corrigan | H04L 12/5835 370/351 |
| 7,657,736 | B2 * | 2/2010 | Godfrey | G06Q 10/107 380/270 |
| 7,821,927 | B2 * | 10/2010 | Alfano et al. | 370/229 |
| 8,050,684 | B2 * | 11/2011 | Lewis | G06Q 20/102 455/414.1 |
| 8,121,069 | B2 * | 2/2012 | Lewis | H04W 4/12 370/310 |
| 8,407,722 | B2 * | 3/2013 | Tuttle | H04L 45/306 709/206 |
| 8,719,397 | B2 * | 5/2014 | Levi | H04L 12/5855 709/206 |
| 2002/0111995 | A1 * | 8/2002 | Mansour et al. | 709/203 |
| 2003/0072451 | A1 * | 4/2003 | Pimentel | H04L 63/08 380/270 |
| 2003/0110242 | A1 * | 6/2003 | Brown et al. | 709/222 |
| 2003/0115317 | A1 * | 6/2003 | Hickson | H04L 29/06 709/224 |

(Continued)

*Primary Examiner* — Imad Hussain
(74) *Attorney, Agent, or Firm* — Soroker-Agmon

(57) ABSTRACT

A system for sending data from at least one computing device, which may be an email server, located at a user location, to a plurality of handsets. The system includes an internal system monitor associated with the at least one computing device, and the monitor provides application connectors deployed at the user location. The system also includes at least one wireless gateway router and a mobile client, which provides a client infrastructure installed on the plurality of handsets, such that the at least one computing device acts uni-directionally and thereby provides secure delivery of the data.

22 Claims, 4 Drawing Sheets

(56) References Cited

U.S. PATENT DOCUMENTS

| | | | | |
|---|---|---|---|---|
| 2004/0052212 A1* | 3/2004 | Baillargeon | H04L 1/0002 | 370/235 |
| 2004/0083271 A1* | 4/2004 | Robert Tosey | H04L 12/587 | 709/207 |
| 2004/0176128 A1* | 9/2004 | Grabelsky | H04M 7/0003 | 455/553.1 |
| 2004/0254993 A1* | 12/2004 | Mamas | | 709/206 |
| 2005/0228876 A1* | 10/2005 | Malik | G06Q 50/01 | 709/223 |
| 2006/0009243 A1* | 1/2006 | Dahan | H04L 12/581 | 455/466 |
| 2006/0031345 A1* | 2/2006 | Chang | G06Q 10/10 | 709/206 |
| 2006/0077940 A1* | 4/2006 | Ganji | H04L 61/106 | 370/338 |
| 2006/0084451 A1* | 4/2006 | Garnero et al. | | 455/466 |
| 2006/0224687 A1* | 10/2006 | Popkin | G06F 17/30132 | 709/217 |
| 2006/0234743 A1* | 10/2006 | Fritsch | H04W 60/00 | 455/514 |
| 2008/0159257 A1* | 7/2008 | Alfano | H04L 47/10 | 370/349 |
| 2010/0003968 A1* | 1/2010 | Cheng | H04L 29/12132 | 455/412.1 |
| 2010/0227632 A1* | 9/2010 | Bell | H04L 12/1859 | 455/466 |
| 2013/0125206 A1* | 5/2013 | Kim | H04L 67/2823 | 726/3 |

* cited by examiner

METHOD AND SYSTEM FOR AN UNCOMPROMISING CONNECTION FROM A COMPUTING DEVICE HAVING INFORMATION STORAGE LIKE EMAIL SERVER TO A WIRELESS MOBILE DEVICE

FIELD OF THE INVENTION

The present invention generally relates to wireless communication and in particular to a method and system for wireless communication from a computing device having information storage to a mobile device.

BACKGROUND OF THE INVENTION

FIG. 1 is a prior art schematic diagram graphically representing communications from an email server to a wireless mobile device. The BlackBerry Enterprise Server BES) in prior art FIG. 1 initiates connections to the wireless network in an outbound direction. To support the BlackBerry wireless email solution in a firewall environment:
1. The firewall must be configured to allow computers within the company that are running the BlackBerry Enterprise Server to initiate TCP/IP connections to an outside server listening on port 3101; and
2. The BlackbBerry servers keep messages transferred from the internal corporate server.

Thus, communication must be able to take place into and out of the corporate firewall 110.

"5-Message queues on the BlackBerry Infrastructure: Messages have been forwarded from the BlackBerry Enterprise Server and are waiting for the BlackBerry Infrastructure to process and deliver them to the BlackBerry Wireless Handhelds™."

U.S. Pat. No. 5,625,670 by Campana, et al, assigned to NTP Corp., similarly to Blackberry, discloses an electronic mail system with RF communications to mobile processors. A system for transmitting information from one of a plurality of originating processors A-N to at least a plurality of destination processors (A-N) which may be transported during operation in accordance with the invention includes at least one gateway switch, a gateway switch storing information received from one of the at least one originating processor prior to transmission of the information to the at least one destination processor; a RF information transmission network for transmitting stored information received from one of the at least one gateway switch, by RF transmission to at least one destination processor; at least one interface switch, an interface switch connecting a gateway switch to the RF transmission network and transmitting stored information received from one of the at least one gateway switch to the RF information transmission network; and wherein the information is transmitted to a receiving interface switch by the electronic mail system in response to an address of the receiving interface switch which has been added to the information originated by the originating processor by either the originating processor or gateway switch and the information is transmitted from the receiving interface switch to the RF information transmission network with an address of the destination processor to receive the information which has been added by either the originating processor, a gateway switch or the receiving interface switch.

Thus, it would be advantageous to have a method and a system to provide for uncompromising communication between an email server and a wireless mobile device.

SUMMARY OF THE INVENTION

Accordingly, it is a principle object of the present invention to provide Push Message technology as a solution that connects a wide range of mobile devices, as well as from PC to PC, including Pocket PC's, SmartPhones, Palm OS devices, Symbian and data storage computing devices such as database servers, file servers and email servers, including Microsoft Exchange, Lotus Domino, POP3, and POP3/IMAP and Webmail clients. The present invention enables users of mobile devices to access their Email, Calendar, Contacts, Notes and Task List.

It is a further principle object of the present invention to assure that no information is stored on the wireless gateway.

It is another principle object of the present invention to provide a data-center server that acts only as a router and does not hold the email messages that are sent.

It is one other object of the present invention to provide a method and a platform with no local server.

It is yet another object of the present invention to provide a method and a platform with an Internet connection over encrypted HTTP, port 80.

It is still another object of the present invention to provide a method and a platform with just-in-time routing when both devices are connected.

It is one more object of the present invention to provide a method and a platform that saves battery time.

It is still yet another object of the present invention to provide a method and a platform that saves airtime costs.

It is one other object of the present invention to provide a method and a platform with no local server.

By adding a Plug-in to the internal system monitor the present invention provides a platform and a method to allow remote users to fully synchronize and Push various data types like: files, database information, images etc. in addition to the electronic mailbox (inbox, inbox sub-folders, drafts, sent items) and other PIM applications—calendar, contacts and tasks.

Synchronize and Push from the supported mobile devices is done as follows:
- Authentication of users via existing infrastructure—no additional user management and administration is required.
- Transferring of all data as encrypted communication using AES, or as free text according to user's preference.
- Synchronization of email attachments, while allowing user to filter out attachments according to size/file type rules.

A system is disclosed for sending data from at least one computing device, which may be an email server, located at a user location, to a plurality of handsets. The system includes an internal system monitor associated with the at least one computing device, and the monitor provides application connectors deployed at the user location. The system also includes at least one wireless gateway router and a mobile client, which provides a client infrastructure installed on the plurality of handsets, such that the at least one computing device acts uni-directionally and thereby provides secure delivery of the data.

Messages and data from the corporate or Internet service provider (ISP) messaging server are being monitored constantly by a thin component installed behind the corporate/home firewall. As the device moves in and out of wireless coverage areas, connections to the server are established to send and receive information.

The present invention provides an end-to-end system that enables organizations to synchronize email, and other personal information (such as calendar, contacts and tasks) for mobile workers who access the Internet using mobile devices (PDA's, smart-phones and other devices).

The system uses industry standard SyncML-DS for delivery of information to various classes of mobile devices. The system is based on carrier-class data centers that will host the proprietary servers that provide mediation between proprietary SyncML clients (mobile devices) and customer organization networks. Access to corporate email and groupware services is accomplished by specialized probes for MS Exchange/Lotus Domino servers that are installed within the customer corporate network.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF AN EXEMPLARY EMBODIMENT

The principles and operation of a method and a system according to the present invention may be better understood with reference to the drawings and the accompanying description, it being understood that these drawings are given for illustrative purposes only and are not meant to be limiting.

Figure 1:
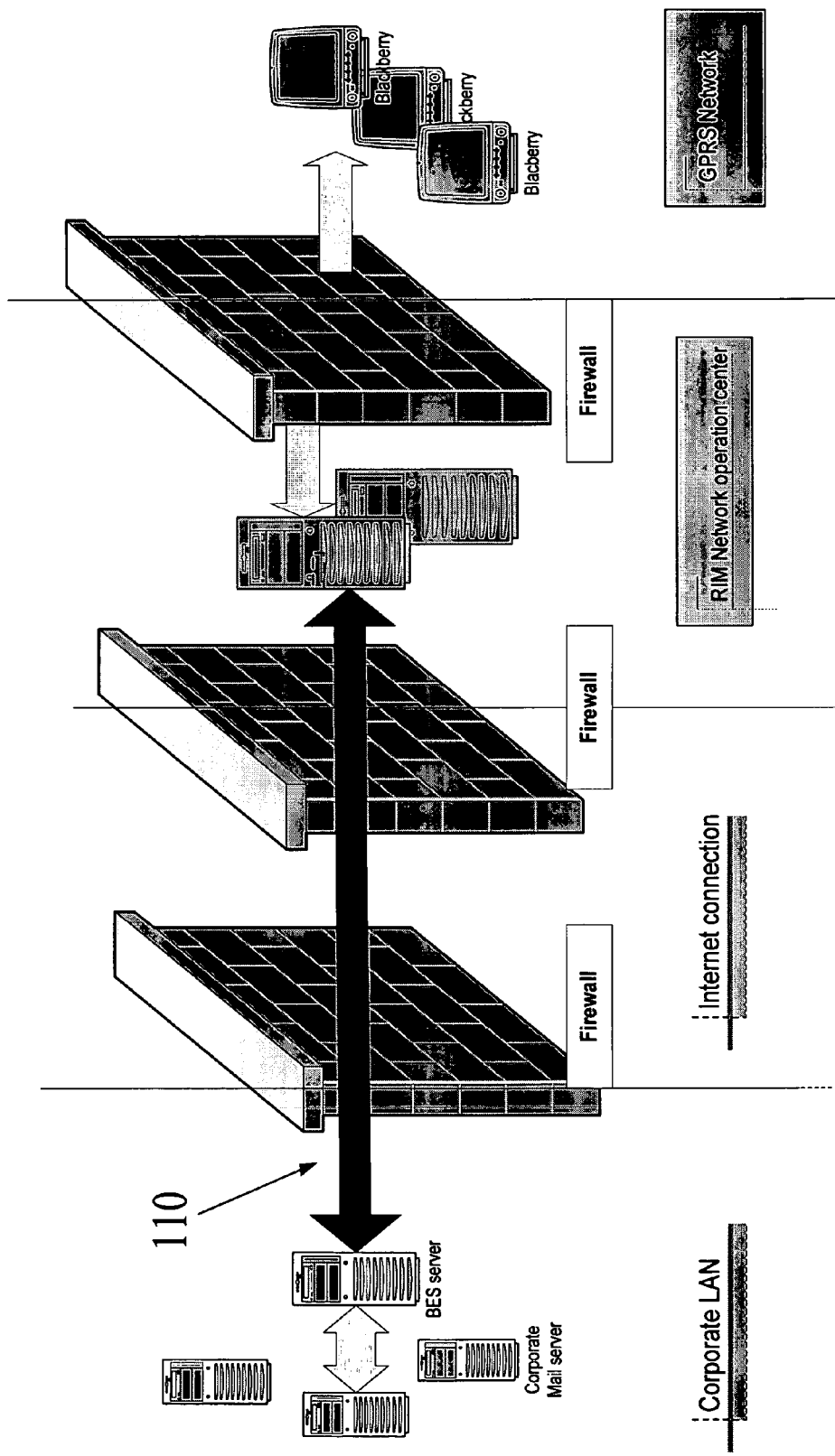
FIG. 1 is a prior art schematic diagram graphically representing communications from an email server to a wireless mobile device.
Figure 2:
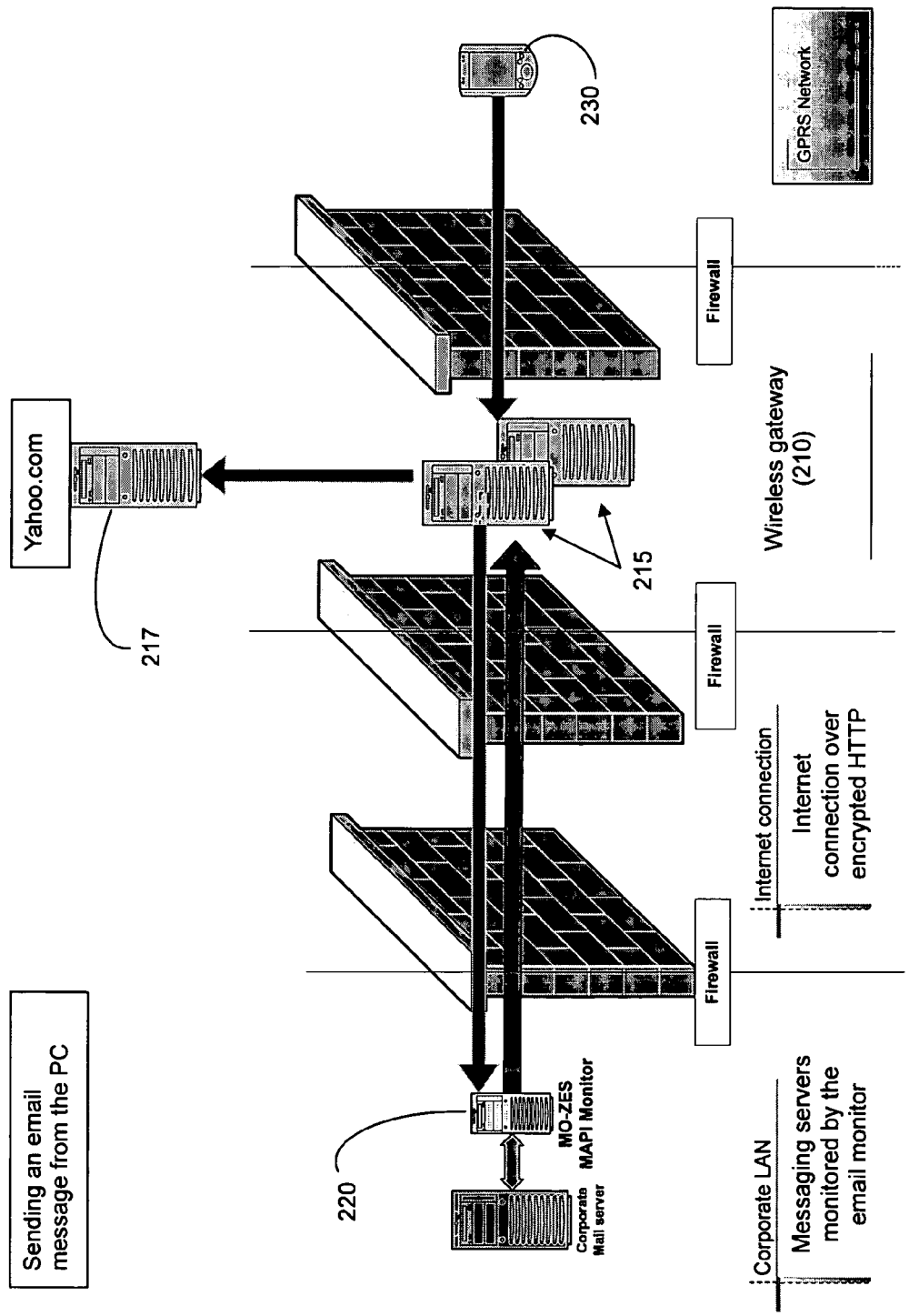
FIG. 2 is a schematic diagram graphically representing communications from an email server to a wireless mobile device, constructed according to the principles of the present invention.

FIG. 2 is a schematic diagram of the system components for communications from an email server to a wireless mobile device, constructed according to the principles of the present invention. The system includes the following major proprietary components:

Wireless gateways 210, which provide a webmail messaging system; data-center servers 215 provide Webmail accounts and wireless gateway 210 Pulls a webmail account and Pushes Data to the webmail public server 217, which may be, for example, Yahoo! Or Hotmail;

An internal system monitor 220, which provides application connectors deployed at customer organizations; and A mobile client 230, which provides a client infrastructure installed on a handheld device, such as a cellphone, PDA, PC, laptop or any computing device.

Wireless gateway 210 includes fully redundant, carrier class server software and acts as intermediary between the customer organization and mobile clients 230. Clients connect to wireless gateway 210 whenever they are connected to the Internet and wish to sync. Organization connectors connect to wireless gateway 210 whenever they discover new information that is available for Clients and wish to send it over.

Wireless gateway 210 communicates with all types of clients (both mobile clients and enterprise Connectors) using encrypted communications over port 80, to be able to traverse enterprise Firewalls without a need for Firewall policy change.

Wireless gateway 210 does not store any messages in transit between the desktop PC and the mobile device. Wireless gateway 210 acts solely as a router, which means that at any given moment wireless gateway 210 does not store any incoming or outgoing data. This is in contrast to other wireless messaging systems which implement a store and forward mechanism.

In addition to the above guidelines, wireless gateway 210 includes the following major features:

Licensing and access control—wireless gateway 210 serves only registered customers.

Management and configuration—wireless gateway 210 allow easy configuration of all operative parameters that will be stored in backend database.

SNMP support for management notifications and commands such as hot configuration change will be added.

Redundancy and Balancing—wireless gateway 210 is fully redundant and load-balancing is achieved using any industry standard load-balancer.

Load endurance—each wireless gateway 210 supports up to 10,000 simultaneous connections per server, and up to 25 Mb per second of data traffic (5,000 email messages of average size 5,000 bytes), on a dual-CPU (e.g., Intel Xeon) server with 1 Gb of RAM and a 1 Gigabit NIC.

Internal system monitor 220 enables mobile access to various enterprise resources such as mail servers, groupware servers and web-sites.

The following list details the Connectors for various applications and a brief description of each:

Exchange Connector

The system supports Exchange servers from version 5.5. The Connector is an email interface client and is installed on a stand-alone server within the organization. No configuration/installation of the Exchange server is required, and there is no configuration on the enterprise firewall (assuming it allows outgoing Port 80 traffic).

Domino Connector

The system supports Domino servers from version R5. The Connector uses Domino SDK's and is installed on a stand-alone server within the organization. No configuration/installation of the Domino server is required, and there is no configuration on the enterprise firewall (assuming it allows outgoing Port 80 traffic).

Yahoo.com Connector The system supports extraction/sending of email messages only from a mail.yahoo.com account.

Web-based Email Clients

A flexible infrastructure allows extracting the information from web-based email clients. Included are connectors for Outlook Web Access, gmail, Hotmail, etc.

POP3/IMAP Connector

The system supports any POP3/IMAP data source with all supported options (timeout, encryption, secure authentication, etc.).

Figure 3:
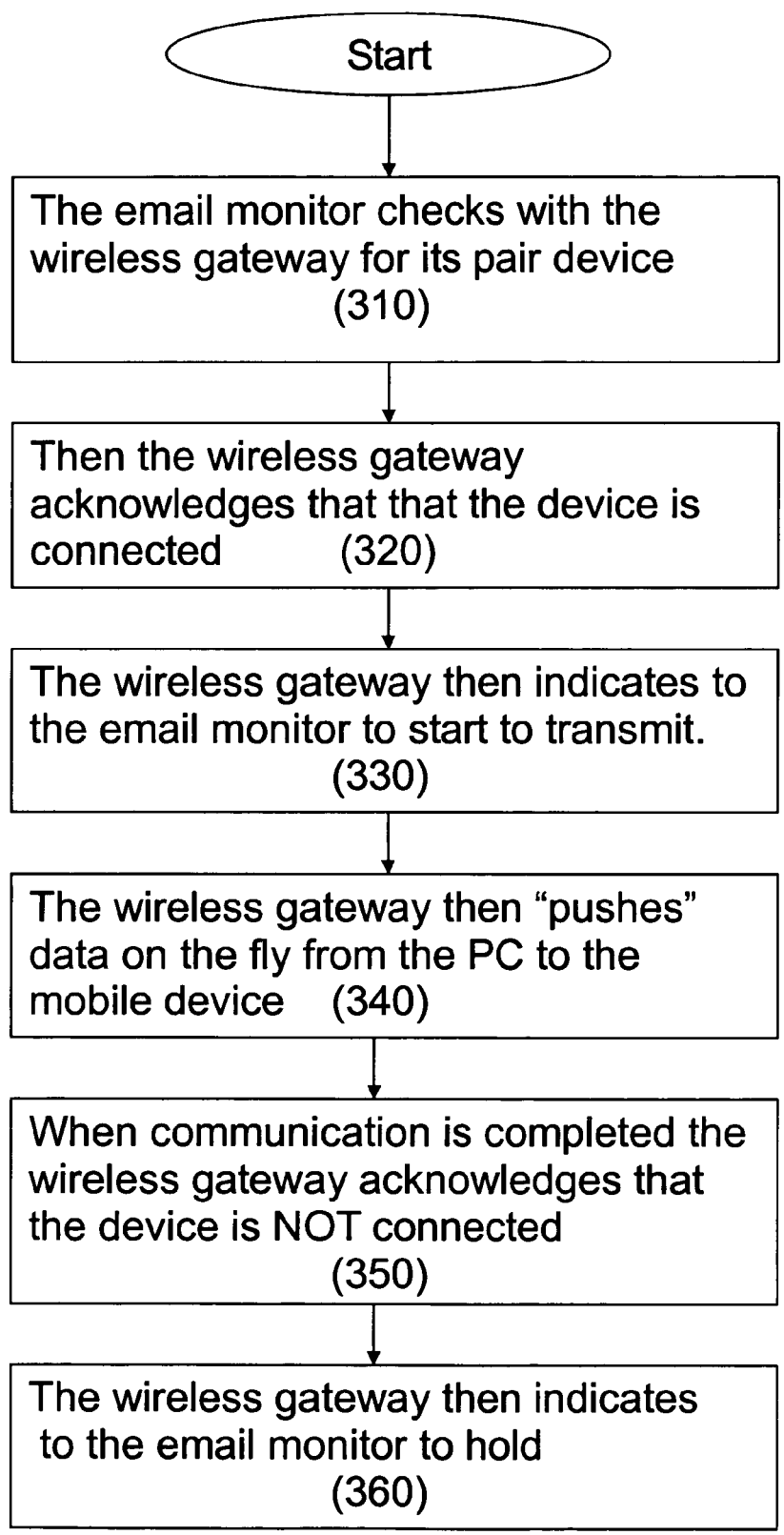
FIG. 3 is a flow chart representing communications from an email server to a wireless mobile device, according to an exemplary embodiment of the present invention.

FIG. 3 is a flow chart representing communications from an email server to a wireless mobile device, according to an exemplary embodiment of the present invention. The communication is in the form of an email message from a PC over a persistent connection initiated by an internal system monitor via port 80 to the wireless gateway. First the internal syncml monitor checks with the wireless gateway for its pair device 310. Then the wireless gateway acknowledges that the device is connected 320. The wireless gateway then indicates to the internal system monitor to start to transmit 330. The wireless gateway then "pushes" data on the fly from the PC to the mobile device 340. Subsequently, when either side of the communication peers (mobile device or PC) is not connected, the wireless gateway acknowledges that the device is NOT connected 350 and the wireless gateway then indicates to the internal system monitor to hold 360. For transmission from the wireless device to the PC all the processing is the same, but in the opposite direction.

Figure 4:
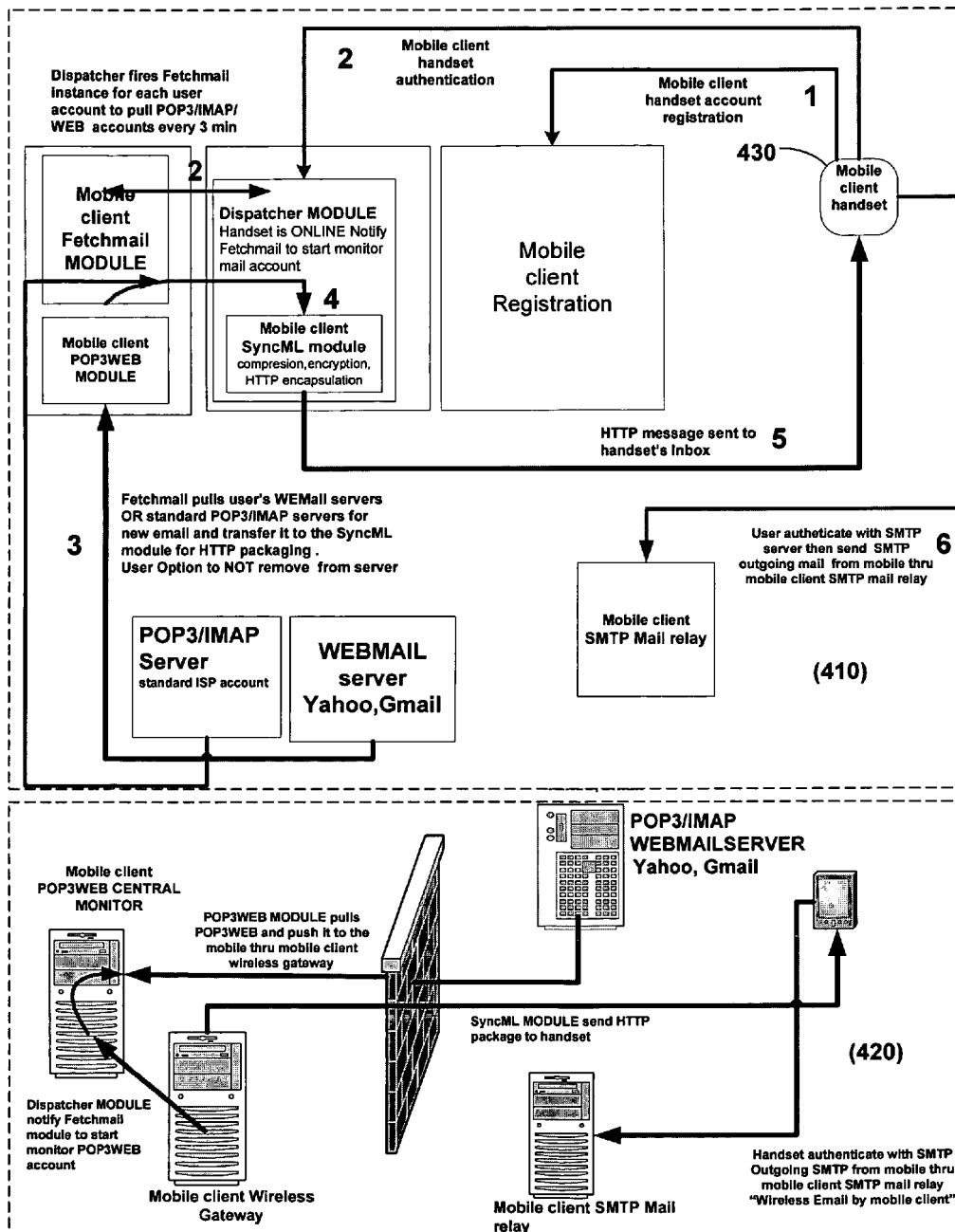
FIG. 4 is a flow diagram representing The POP3/IMAP/WEB central server, according to an exemplary embodiment of the present invention.

FIG. 4 is a flow diagram representing The POP3/IMAP/WEB central server, according to an exemplary embodiment of the present invention. Thus, the present invention does not use a local server. The POP3/IMAP/WEB central server is composed of two modules, a Fetchmail module 410 and a POP3WEBMAIL module 420.

Fetchmail module 410 is responsible for monitoring email accounts using POP3/IMAP protocols. POP3WEBMAIL (FreePOPs) module 420 functions as a gateway which translate POP3 requests to Web requests and vice versa. This is in order to get access to the Webmail account and pull new messages from the Inbox and other folders. Fetchmail interacts with POP3WEBMAIL in case the connected mobile device Requested during the registration process to push the user's mail from his webmail account, such as Yahoo, Gmail etc.

a. The mobile client handset 430 authenticates and connects to the wireless gateway.
b. The wireless gateway queries the Registration database to get user account information: POP3/IMAP user/password, POP3/IMAP server IP.
c. Fetchmail Module 410 is notified by the wireless gateway once a mobile device gets On-Line.
The notification message comprises the user's POP3/IMAP account information.
d. Upon receiving notification, Fetchmail module starts a Fetchmail instance for the particular user/handset.
In case of monitoring WEBMAIL account, the POP3 server's IP that Fetchmail will use is the IP address of the local POP3WEBMAIL module.
e. Fetchmail monitors the POP3 or WEBMAIL account at interval of 3 minutes.
f. Fetchmail establishes a TCP connection with the POP3WEBMAIL module or with the remote POP3/IMAP host that was defined by the user during the registration process.

The present invention also provides the following exemplary, non-limiting features:

Email filtering based on various attributes of the email message, such as sender's address, keywords in subject, etc.

Sending information in chunks and allowing user to resume in the middle of a broken communication when connection is re-gained.

Device cleanup—maintaining a configurable quantity/timeline of historic items. Automatic Device Cleanup helps the user by protecting limited device storage with an automatic cleanup facility. This works by keeping only a certain amount of mail, tasks, or calendar entries on the device based on a simple configuration regarding Automatic Wireless Connection Management—When the Client application synchronizes with the server, it first checks for an available network connection. If one is not found, it automatically initiates a network connection if possible. When the synchronization session is over, we automatically end the network connection. Less sophisticated solutions may not "hang up" and thus may leave an expensive wireless connection open indefinitely.

Device merge—allows user to synchronize more than one mobile application or device. This can keep multiple devices and email clients in sync for the same user. A single user might sync their SyncML enabled phone, a Pocket PC handheld, Outlook™ at home and at the office. As they add or substitute devices over time, it is important to be able to "merge" that device and any data on it in with the others. Managing duplicates and combining records without losing data is very complex.

Simple (one click) installation of client software. The installation process for the client software is simple. Even if technical staff are able to pre configure devices, it is fairly common for a device to drain its battery erasing all memory. Thus, it is important for the client-side sync software to be easy to install. The client install routine can be posted just a click away on the Intranet site. After the hands-off install routine runs, the user clicks "Sync" then enters a password, and is ready to sync and restore his device. This provides an effective backup strategy for the device as well.

No Configuration Effort Required—spares the end user from having to participate in configuring their device for synchronization.

Session Control—The end user needs to have a view into the sync session as it happens, as well as having some basic controls. The present invention offers detailed status messages during the sync session and a cancel button to end the sync session if desired. The client software also includes a byte counter that is updated throughout the session.

Multiple Connection Modes—As today's mobile worker logs more and more time away from office LAN connections, multiple device connection modes need to be supported. The dual profile feature is especially valuable where users will switch frequently between connection methods. The present invention supports all of the following methods:
  Wireless public networks (GSM, GPRS, CDPD, TDMA, CDMA, etc.);
  Wireless LAN (i.e. 802.11);
  Ethernet Cradle;
  PC Cradle (leveraging the PC network connection);
  Wireline modem;
  Wireless phone attached to handheld; and
  Wireless infrared.

User-friendly, one screen configuration on the mobile device side.

Meeting requests—allowing user to see and respond to meeting requests on certain devices that can support this function. Users should be able to create, receive, accept, deny and tentatively accept meeting requests on the handheld device. They should also be able to view requests in their calendar, and send updates or notices related to a meeting. The present invention offers full support for this functionality, with some device-specific limitations inherent to particular platforms.

Multiple time zones—information presented to the user according to his current time-zone as it is configured in the mobile device. Domino and Exchange provide time zone management capabilities related to meeting requests for individuals in different time zones. For instance, an intra-company conference call between Europe and the US must have the time recorded accurately in each attendee's calendar. The present invention integrates with this functionality so that meeting requests appear accurately in all attendees' calendars regardless of their time zone.

Deletes Captured, Not Inferred—prior art solutions infer deletion of PIM records if the client record no longer exists. If deletes are inferred, it is possible to mistakenly delete all of the server data for a device that has been compromised or reset. The present invention behaves differently, actually capturing the record deletion event to bring back to the server.

Read mark management—records that are read by the mobile user are marked as 'read' in the server. Due to subtleties of the internal mechanics of different Email servers, accurate synchronization of "read marks" is technically challenging. The present invention supports full synchronization of read marks.

Recurring entries—the system handles a recurring appointment, including any exceptions it may have, as a single object and allows the mobile user to interact with and synchronizing of that object (e.g. when a user reschedules a recurrent event from a mobile device, all occurrences of that event in the device and server are re-scheduled accordingly).

Field level sync—synchronize specific changed fields when that function is supported by the mobile device/PIM application used. Often, different parts of specific records are updated on different devices or through direct server access. This creates synchronization conflicts that can result in lost data if not handled properly. The present invention uses the most granular sync level possible and only moves the specific fields that have changed. This also drastically reduces session lengths. The alternative approach, synchronizing the entire record, is very inefficient and can overwrite important data.

Dual Sync Choices—One very common situation is to have a handheld device switch back and forth between high speed cradle sync and a lower speed wireless connection. Instead of requiring the user to constantly switch their profile settings back and forth to accommodate, each profile supports two different ways of synchronizing Sync and SyncXpress . . . each with its own settings. For instance, the SyncXpress settings might be optimized for a wireless connection with more stringent attachment filtering and more aggressive email message truncation to keep sync times down. Users get a button for each sync method.

Email Sync Settings—Email tends to drive the bulk of data traffic to and from the device, compared to the other PIM applications. The present invention allows email to be filtered based on specific email addresses (from and to), the contents of the subject line, priority/importance, read vs. unread and age of the message. Email can also be truncated if the message body exceeds a certain length. Email is automatically deleted after it reaches the configurable age limit.

Email Attachment Handling—Email attachments often present challenges to the handheld device due to size and file format. The present invention offers a variety of options for intelligently managing the delivery of Email attachments—Email attachments can be turned off and on, and attachments delivered can be filtered by size and by file format. Users are informed of attachments that have been filtered out, and can choose to override the filters for individual attachments that they wish to see.

Calendar and Task Sync Settings—Calendar and task data does not typically consume much bandwidth, however, initial calendar loads on a device can take some time if unfiltered. The present invention allows calendar and task entries to be filtered for a set number of days forward and backward.

Preview mail (interactive synchronization session)—prompts user with some information before each email is downloaded. With Email Accelerator, there is a wide variety of configuration settings that govern the system behavior. These can be very individualized or very standardized depending on the degree of administrative control desired. These profile settings can be dynamically adjusted by users to meet their changing needs, protect limited device storage, affect session lengths, or deal with different connectivity modes. For instance, a user may opt not to sync attachments because they wanted the quickest possible sync time. More detail about profile settings is described in the administrative tools section below.

Synchronization management—the user can view the history of synchronizations at the mobile device level and can change the parameters and rules used for synchronization.

Email/SMS alerts for events or new mail.

View Connection History—The end user has access to the synchronization logs on their device. This is helpful for confirming expected information arrived, and facilitates troubleshooting how far back to go.

The present invention offers several mechanisms targeted for different types of devices to proactively update users with critical information. This allows users to receive hands-off updates, so that they don't need to worry about keeping current or manually triggering device synchronization.

Push for Email, Calendar, Contacts, and Tasks—the server engine sees a qualifying inbound email for a user and automatically send it out to the user's device. The user receives the email in the device Inbox in real time, providing an "always available" experience. Users have control over the filters and options that drive the push activity.

Alerts for Email and Calendar—The present invention provides a broader proactive notification capability that works with any device capable of receiving email or an SMS message. Similar to the push capabilities, the server sees an incoming message or upcoming event and proactively notifies the mobile device.

Alert Options—For email, a truncated version of the message is forwarded. For calendar entries, a daily calendar update is mailed at a specific time each day and any updates to that day's events can trigger a calendar update alert message to be sent.

Full Sync Devices—These devices receive complete updates for email and the PIM applications. The user is able to work offline, and connect occasionally for updates.

SyncML Devices—supports Contacts and Calendar sync. The server is SyncML certified, giving the ability to automatically support new handhelds and phones that ship with a SyncML client. Nokia, Sony, Ericsson, Motorola, Samsung and others have partnered on the SyncML initiative, and it is expected most mobile phones and smart phones will ship with the SyncML client installed.

The present invention expands the definition of PIM sync to include additional highly personal and contextually-relevant information. The users work as they would normally work in their groupware client, and information is automatically gathered and delivered.

Appointments—The present invention extends the functionality of Notes and Outlook by allowing users to link appointments on their calendar to contacts in their address book and create meeting requests, including recurring appointments. These special appointments key the server to gather additional contextually-relevant information and make it available to all of the user's devices.

Check-point Restart—Mobile communications can be unreliable with frequent line drops. The present invention uses check-point restart to minimize the impact of dropped lines. The server keeps track of the last acknowledged packet, and resumes transmission where it left off. For example, dropping a slow wireless connection after 90% of a 100K email attachment is transmitted does not require retransmission of the entire file. This has great usability implications and ensures more cost-efficient communications.

Compression—Communications between the server and client are compressed to protect bandwidth and minimize connect times. For email, both the message body and any attachments are compressed. Because compression of very small units of information may actually decrease communications efficiency, the present invention selectively compresses based on the size of the communication. In addition, the present invention pre-compresses the information at a high level instead of breaking it up into packets and then compressing. This results in a more bandwidth efficient communication.

Wireless Optimizations—Wireless gateway 210 is a robust and efficient engine that manages communications between client and server components. Wireless Gateway 210 uses an advanced message Routing queuing architecture, packet optimization technology and binary XML for ultra-efficient communications over wireless networks.

Smart Attachment Filtering—Part of each sync profile is a limit on the size of email attachments that will be delivered. The present invention applies the limit to the total size of all the attachments to the email once they have been compressed. For instance, if the limit is set to 200Kb, then a 500Kb attachment that compressed to 50Kb would be delivered. Meanwhile, if a single mail had 20 attachments of 199Kb that compressed to 20Kb each, it would not be delivered since the total size (compressed) would be 400Kb—over the limit. Other products apply simpler logic just looking at the original size of each file. Thus, the 50Kb compressed attachment would NOT be delivered and the very large mail with 20 attachments WOULD be delivered . . . exactly the opposite of what makes sense to do.

User Authentication—The present invention offers its own internal user authentication capability. In addition, existing authentication options can also be leveraged. This approach decreases administrative overhead and also imposes less burden on end users. Even if existing authentication options are used, the internal capability can be useful for testing. Note that multiple methods can be used simultaneously, though for each user only one method is used. The following forms of authentication are supported:
LDAP authentication
NT domain authentication
Domino authentication
Emblaze Doors authentication User Disablement—Administrators are able to "turn off" a specific user, user group, or device. For example, they may turnoff the account of a stolen device so that no unauthorized persons are able to sync with company servers.

Encryption Options—allows administrators to select the encryption options that best meets their needs for balancing level of security with communications efficiency. Administrators may assign different encryption options to different profiles. The following standard options are available:
Triple DES not used
AES
No encryption Credential Expiration Options—System administrators can prevent storage of network credentials on the device by forcing users to enter password each time they connect to the network to sync. To support more frequent synchronization including automatic synchronization, there is also an option to allow credentials to be stored for a configurable length of time. In this case, the actual user password is required during the first synchronization, and after successful connection the encrypted user credentials (but not the actual password) are stored on the device and considered valid by the server for a set length of time. This provides a flexible method to balance usability with extreme security.

Session-Based Key Exchange—Each synchronization session generates new encryption keys to ensure security. If a malicious party manages to eavesdrop and somehow ascertain a session key, it will only be valid for that session. Given the nature of synchronization sessions, i.e. typically short and frequent, this makes it difficult to compromise the encryption in a meaningful way.

Theft/Loss Protection—The present ibnvention provides the capability to remotely and automatically deactivate devices and destroy data. System administrators can configure varying levels of data elimination:
Lock out the device so it cannot sync;
Delete only email and PIM data;
Delete selected applications, files, and data;
Delete data on removable storage media; and
Kill (hard reset) the device to remove all data and apps.

These instructions can be pushed out to addressable devices, or can be configured to take place in a variety of circumstances automatically, for instance, if network login frequency is too low.

Power-on Password—Administrators can require users to use a power-on password to protect data on the device. The password strength can be set to anything from a simple four-digit PIN up to a long, case-sensitive alphanumeric string. Logon attempts can be tracked and automatically invoke a security policy (such as lockout) after a set number of failed attempts. For emergencies, locked-out phones can be enabled for 911 and inbound call use. In the event of a forgotten password, administrators also have the ability to push out a one-time use password for the user.

Automatic Deployment—The geographic dispersion of mobile computing deployments creates unique challenges for IT staff. It is very important to make installation as easy as possible for the administrator, while protecting the user from undue involvement. Frequently the handheld devices to be supported already exist due to corporate or personal purchase, and it is not possible to do the same sort of initial imaging that would have been done if they had been purchased separately. The present invention overcomes this challenge by providing a hands-off automatic deployment option so that users can easily self-install without sending their devices to IT.

HotSync Compatibility—The present invention is fully compatible with the native HotSync utility for cradle synchronization for Palm OS devices and "takes over" the email and PIM synchronization conduits, but lets HotSync perform other required activities. Triggering a HotSync connection will automatically launch capabilities to update the device. Prior art systems, by contrast, break HotSync, requiring a confusing two-step installation and replacing HotSync with a proprietary proxy solution that takes over all of the serial communication to the cradled device.

Default User Profile—setup a default profile for new users. This enables a new user to begin synchronizing immediately. Combined with the user auto-discovery function, this allows for new users to quickly and easily start synchronizing without any administrator intervention. Custom user settings or assignment to a group profile can take place at a later time.

Advanced User Management—The management module is able to import user lists and user group assignments from existing directory services. This prevents duplicate administrative effort and decreases error potential and offers a variety of integration options for user list management, as listed below (multiple sources can be used simultaneously):

Active Directory
Any other LDAP-compliant source
Windows NT domains
Text or other database sources It is to be understood that the phraseology and terminology employed herein are for the purpose of description, and should not be regarded as limiting.

It is important, therefore, that the scope of the invention is not construed as being limited by the illustrative embodiments set forth herein. Other variations are possible within the scope of the present invention as defined in the appended claims and their equivalents.

We claim:

1. A system for synchronizing data comprising messages, between a server, with a mobile device that sends and receives wireless transmissions, said system comprising:
    an internal system monitor associated with said server, said internal monitor system deployed at the server to determine if a message is available for the mobile device in an application;
    said server checking with at least one wireless gateway router to determine that the mobile device is connected and can receive data, before commencing a live communication session to synchronize data between the server and the mobile device;
    said at least one wireless gateway router indicating to said server that the mobile device is connected and can receive data,
    wherein said server initiates transmission and reception of data with the mobile device only upon receipt of the indication responsive to the determination that the mobile device is connected and can receive data; and
    wherein said at least one wireless gateway does not store the synchronized data comprising messages sent from said server to the mobile device or messages from the mobile device to the server thus avoiding storage of the data comprising messages in an intermediate entity connecting said server to the mobile device and thereby provides live and secure delivery of the data.

2. The system of claim 1, wherein the system provides just in time routing by transmitting the data comprising a message when both said server and the mobile device are connected.

3. The system of claim 1, wherein said server verifies that data transmitted from the application server is not stored in an intermediate entity connecting said server to the mobile device by transmitting the data only upon indication that the mobile device is connected.

4. The system of claim 1, wherein said server pulls at least one webmail account from at least one webmail server.

5. The system of claim 1, wherein said at least one wireless gateway router indicates that the mobile device is no longer connected and instructs said server to hold transmission of the data to the mobile device.

6. The system of claim 1, wherein said at least one wireless gateway router further comprises at least one data-center server, which provides a plurality of webmail accounts.

7. The system of claim 1, wherein said at least one wireless gateway router further comprises at least one webmail public server to which said wireless gateway router pushes the data.

8. The system of claim 6, wherein the at least one data-center server is an email server.

9. The system of claim 1, wherein said server has access to a POP3 email server.

10. The system of claim 1, wherein said server has access to an IMAP email server.

11. The system of claim 1, wherein said server has access to a webmail server.

12. The system of claim 11, wherein the webmail server uses HTTP protocol.

13. The system of claim 1, wherein the mobile device is a mobile handset.

14. The system of claim 13, wherein the mobile device is a mobile phone.

15. The system of claim 13, wherein the mobile device is a pocket PC.

16. The system of claim 13, wherein the mobile device is a smartphone.

17. The system of claim 13, wherein the mobile device is a Personal Digital Assistance (PDA) device.

18. The system of claim 13, wherein the mobile device is a Mobile phone client.

19. The system of claim 3, wherein the mobile device implements just-in-time routing.

20. The system of claim 1, wherein the data comprising a message is at least one of the group comprising: word processing files; electronic spreadsheets; ERP database information; Images; Photographs; Bulletin board; and Personal information.

21. A method for synchronizing data comprising messages, between a server, with a mobile device that sends and receives wireless transmissions, said method comprising:
    monitoring application data by an internal system monitor associated with said server to determine if a message is available for the mobile device in an application;
    said server checking with at least one wireless gateway router to determine that the mobile device is connected and can receive data;
    said server receiving an indication from the at least one wireless gateway that the mobile device for synchronizing the data is connected and can receive data;
    responsive to the indication commencing a live communication session to synchronize data between the server and the mobile device;
    in the communication session said server initiates transmission and reception of data with the mobile device only upon receipt of the indication responsive to the determination that the mobile device is connected and can receive data;
    said server terminating the transmission to the mobile device upon receipt of an indication from said wireless gateway that the mobile device for synchronizing the data comprising a message has become disconnected, thus avoiding storage of the message in an intermediate entity between the mobile device and said server.

22. The method according to claim 21, wherein the method provides just in time routing by transmitting the message when both said server and the mobile device are connected.

\* \* \* \* \*